Dec. 29, 1931. F. KSELLMANN 1,838,947
PIT MAT FOR BOWLING ALLEYS
Filed July 18, 1928
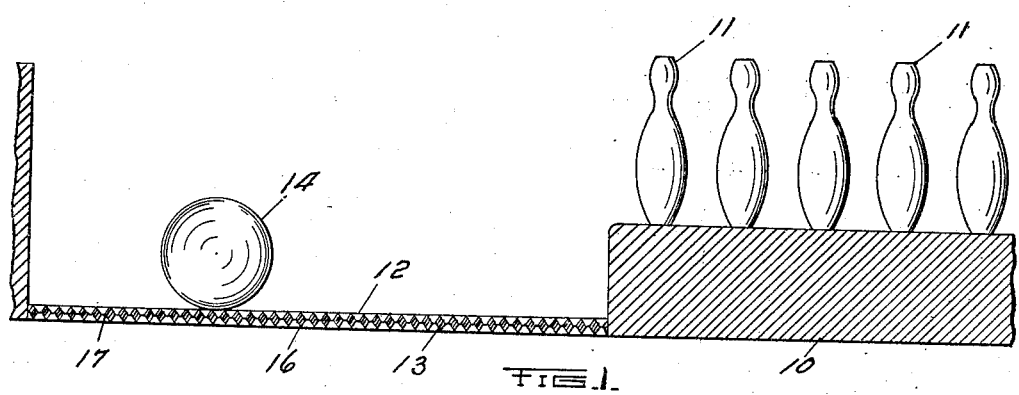
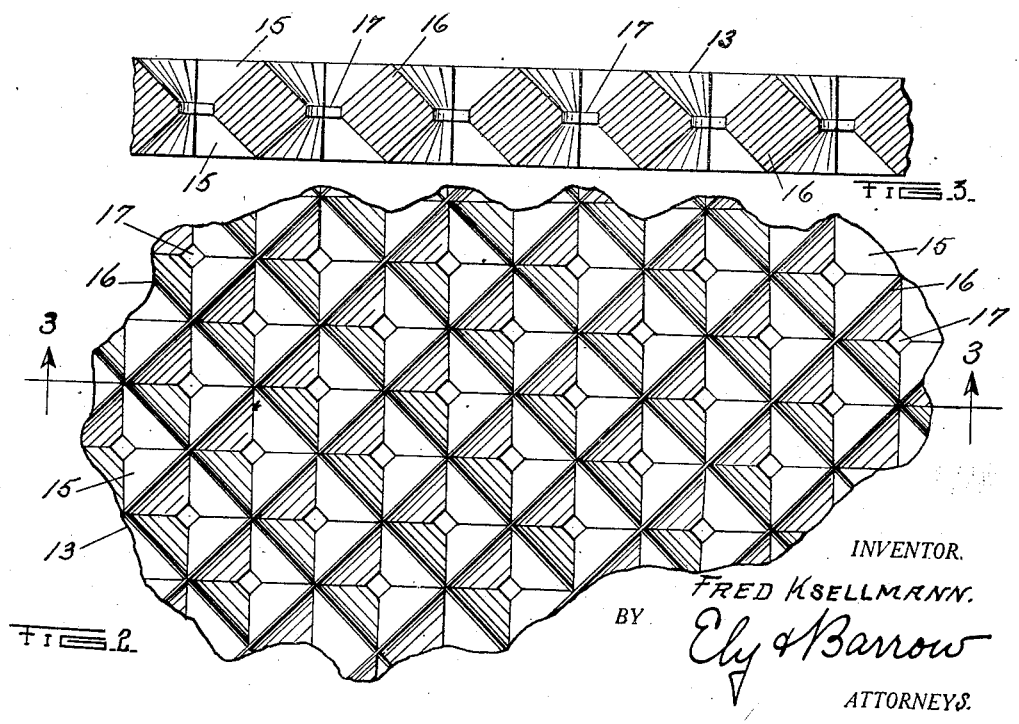
INVENTOR.
FRED KSELLMANN.
BY Ely & Barrow
ATTORNEYS.

Patented Dec. 29, 1931

1,838,947

UNITED STATES PATENT OFFICE

FRED KSELLMANN, OF AKRON, OHIO

PIT MAT FOR BOWLING ALLEYS

Application filed July 18, 1928. Serial No. 293,693.

This invention relates to pit mats for bowling alleys such as disclosed in United States Patent No. 1,666,938.

The object of the invention is to provide a pit mat having the desirable strength, resilience and self-cleaning properties of a reticulated or pocketed rubber sheet, the pockets of which are pyramidal in formation and the walls of which are formed with acuminate upper edges, but which, without detracting from these properties, is rendered reversible so as to be capable of a longer effective life under the strenuous wearing action to which this type of mat is subjected.

The foregoing object is attained in the pit mat disclosed in the accompanying drawings and described below. It is to be understood that the disclosure is illustrative only and is not to be taken as unduly limiting the invention.

Of the accompanying drawings,

Figure 1 is a longitudinal section through a bowling alley pit in which the invention is embodied;

Figure 2 is a plan of a portion of the mat; and

Figure 3 is a section on line 3—3 of Figure 2.

Referring to the drawings, the numeral 10 designates a bowling alley, the pins being indicated thereon at 11 and the usual pit at 12. In the pit is mounted a mat 13 constructed in accordance with the invention, a ball 14 being shown on the mat.

The mat 13 may be constructed in one or more pieces of a size such as to permit easy insertion thereof in or removal from the pit for purposes of cleaning the pit out occasionally.

As best shown in Figure 2, the mat is of reticulated, vulcanized rubber of about one inch thickness and formed with pockets 15, 15 preferably in the form of frustums of polygonal pyramids, the division walls 16, 16 being pointed at the top so as not to collect dust, but having widely diverging sides as shown to provide a substantial body of rubber to resist tearing and abrasion. The pockets have outlets 17, 17 in the bottom thereof, through which dirt and dust can work under the mat under the vibratory action of the balls and pins falling upon the mat and the action due to pin boys walking thereon. These outlets are comparatively small so that while they permit dust working under the mat, the body of the mat prevents flying of dust in any considerable amount when a ball or pin strikes the mat.

The pockets 15 are formed on both sides of the mat and in opposed relationship so that outlets 17 are common to the pockets on either side of the mat and the walls of the pockets serve to reinforce each other, whereby the pockets on the under side of the mat provide spaces for trapping considerable quantities of dirt under the mat and when one side of the mat has become worn, it may be reversed and the other side used.

By forming the mat of tough, resilient, vulcanized rubber, such as automobile tire tread stock, it is capable of long and effective use for the purpose described. It cannot be flattened or compacted so as soon to lose its dust eliminating characteristics as is the case with certain types of pit mats heretofore employed. The balls accordingly are returned for reuse without the usual collection of dirt and dust to soil the players' hands and clothes. The comparatively soft, resilient rubber of the mat furthermore does not in any way mark or injure the balls or pins.

The maximum dimensions of the pockets should not be so great that they will not afford a walking surface comfortable to the pin boys. The thickness of the mat is substantial, to provide the desired dust eliminating and cushioning qualities.

Modifications of the invention may be resorted to without departing from the spirit thereof or the scope of the appended claims.

What is claimed is:—

1. A pit mat for bowling alleys, said mat being constructed of soft, tough, vulcanized rubber formed with reticulations defining pockets of frusto-pyramidal shape, the division walls therebetween being formed with acuminate upper edges so that dust cannot collect upon the upper surface of the mat, the sides of said walls diverging widely to provide a sturdy base portion, the bottoms of the pockets having permanently open passages extending therefrom through the mat whereby dust collecting in the pockets may pass freely through the mat, said pockets being provided upon both sides of the sheet in opposed relationship and said openings being common to the opposed pockets so that the mat comprises faces which are duplicates of each other, whereby the mat can be used on either side at will.

2. A pit mat for bowling alleys, said mat comprising a sheet of tough, resilient material formed with opposed pockets in the opposite faces thereof, the division walls between the pockets being formed with sharp edges at the surfaces of the mat, and permanently open apertures through the mat common to the opposed pockets so that the mat comprises faces which are duplicates of each other, whereby the mat can be used on either side at will.

FRED KSELLMANN.